(12) United States Patent
Moriya

(10) Patent No.: US 8,450,739 B2
(45) Date of Patent: May 28, 2013

(54) ELECTROOPTICAL DEVICE SUBSTRATE AND METHOD FOR MANUFACTURING THE SAME, ELECTROOPTICAL DEVICE, AND ELECTRONIC APPARATUS

(75) Inventor: Soichi Moriya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 198 days.

(21) Appl. No.: 12/976,231

(22) Filed: Dec. 22, 2010

(65) Prior Publication Data
US 2011/0163317 A1    Jul. 7, 2011

(30) Foreign Application Priority Data
Jan. 7, 2010    (JP) .................................. 2010-002266

(51) Int. Cl.
*H01L 51/52*    (2006.01)
*H01L 51/56*    (2006.01)

(52) U.S. Cl.
USPC ............... 257/59; 257/40; 257/684; 257/783; 257/E51.018; 257/E27.111; 438/34; 438/149; 438/17; 438/107; 438/458

(58) Field of Classification Search
USPC .............. 257/E27.111, 40, 59, E51.018, 684, 257/783; 438/34, 149, 17, 107, 458, 689
See application file for complete search history.

(56) References Cited

U.S. PATENT DOCUMENTS

2008/0012009 A1* 1/2008 Hashizume et al. ............ 257/40
2008/0012012 A1* 1/2008 Hara ................................ 257/40

FOREIGN PATENT DOCUMENTS

| JP | 2004-087976 A | 3/2004 |
| JP | 2006-237477 A | 9/2006 |

* cited by examiner

*Primary Examiner* — Cathy N Lam
(74) *Attorney, Agent, or Firm* — ALG Intellectual Property, LLC

(57) ABSTRACT

An electrooptical device substrate, contains: a first insulating film provided on a substrate; two or more pixels; a first concave portion provided in the first insulating film over the two or more pixels; a second concave portion provided on the bottom surface of the first concave portion; a thin film transistor containing an organic semiconductor layer provided in the second concave portion, a gate insulating film provided on the organic semiconductor layer, and a gate electrode provided on the gate insulating film and being matched to one pixel among the two or more pixels; a scanning line which is provided at an upper side with respect to the gate insulating film and provided in the first concave portion over the two or more pixels; and a data line electrically connected to the thin film transistor.

8 Claims, 10 Drawing Sheets

ELECTROOPTICAL DEVICE SUBSTRATE AND METHOD FOR MANUFACTURING THE SAME, ELECTROOPTICAL DEVICE, AND ELECTRONIC APPARATUS

CROSS-REFERENCE TO RELATED APPLICATION

This application is based on and claims priority from Japanese Patent Application No. 2010-002266, filed on Jan. 7, 2010, the contents of which are incorporated herein by reference.

BACKGROUND

1. Technical Field

The present invention relates to an electrooptical device substrate and a method for manufacturing the same, an electrooptical device, and an electronic apparatus.

2. Related Art

Mentioned as this kind of the electrooptical device substrate is, for example, one having an organic thin film transistor (hereinafter referred to as an "organic TFT (Thin Film Transistor)" as appropriate) on a support substrate, such as a plastic substrate. As a method for manufacturing such an electrooptical device substrate, a technique for forming thin film layers, such as an organic semiconductor layer and a gate electrode, which constitute the organic TFT, by, for example, a printing method, such as a liquid droplet ejecting method is known, for example.

For example, JP-A-2004-87976 discloses a technique including irradiating a base layer of a conductive layer to be formed, i.e., a photocatalyst containing layer, with ultraviolet rays through a photomask, thereby forming a region having lyophilicity to a conductive layer material liquid and a region having liquid repellency to the conductive layer material on the base layer. Moreover, a technique including irradiating only a region, which needs to be rendered lyophilic, with laser light instead of the exposure through a photomask is also disclosed.

JP-A-2006-237477 discloses a technique of utilizing an interlayer insulating film on a gate insulating film as a partition for forming a gate electrode using a liquid droplet ejecting method.

However, when the thin film layers constituting the organic TFT, such as the organic semiconductor layer and the gate electrode, are laminated using the technique disclosed in JP-A-2004-87976, a base layer formation process and an exposure process for forming a lyophilic region and a liquid repellent region need to be performed whenever each thin film layer is formed. By repeating these processes, there arises a possibility that thin film layers previously formed are damaged or device characteristics are adversely affected. When a plastic substrate is used as a support substrate, the support substrate contracts due to heat when the number of times of performing the exposure process is larger, and there arises a possibility that the alignment accuracy of each thin film layer formed on the support substrate decreases in some cases. When laser light is emitted in place of the exposure using a photomask, the treatment time becomes very long. Moreover, fine patterns are difficult to form.

JP-A-2006-237477 discloses a method for forming a gate electrode using an ink jet method but does not disclose a method for laminating two or more thin film layers, such as not only a gate electrode but an organic semiconductor layer, using an ink jet method.

SUMMARY

The aspects of the invention have been made in order to at least partially solve the above-described problems.

In order to solve the above-described problems, an electrooptical device substrate according to an aspect of the invention contains a first insulating film provided on a substrate, two or more pixels, a first concave portion provided in the first insulating film over the two or more pixels, a second concave portion provided on the bottom surface of the first concave portion, a thin film transistor containing an organic semiconductor layer provided in the second concave portion, a gate insulating film provided on the organic semiconductor layer, and a gate electrode provided on the gate insulating film and being matched to one pixel among the two or more pixels, a scanning line which is provided at an upper side with respect to the gate insulating film and provided in the first concave portion over the two or more pixels, and a data line electrically connected to the thin film transistor.

According to an electrooptical device using the electrooptical device substrate of the aspect of the invention, scanning signals are successively supplied to the thin film transistors through the scanning lines during operation, and image signals are written in pixel electrodes through the thin film transistors from the data lines. Thus, active-matrix driving in the two or more pixels is achieved. The image signals are supplied from the data lines to the pixel electrodes through the thin film transistors by turning ON and OFF of the thin film transistors electrically connected between the data lines and the pixel electrodes in accordance with the scanning signals. Two or more of the pixel electrodes are provided in a matrix shape corresponding to the intersection of the data lines and the scanning lines in a region that is to serve as a display region on the substrate.

One thin film transistor is provided for each pixel provided with the pixel electrode. The thin film transistor contains an organic semiconductor layer containing an organic semiconductor material and a gate electrode. The organic semiconductor layer is disposed at a lower side with respect to the scanning line. The gate electrode contains one portion of the scanning line and is overlapped with a channel region of the organic semiconductor layer through a gate insulating film (in other words, a portion of scanning line which is overlapped with the channel region of the organic semiconductor layer through the gate insulating film functions as a gate electrode). More specifically, the thin film transistor is formed as a top gate organic TFT.

Particularly in the aspect of the invention, the first concave portions provided in the first insulating film over the two or more pixels and the second concave portions provided on the bottom surface of the first concave portions are provided. In other words, the first insulating film is provided that has first partition portions that separate two or more organic semiconductor layers provided on the substrate from each other and second partition portions that separate two mutually adjacent scanning lines from each other. Typically, the first insulating film is disposed at a lower side with respect to the organic semiconductor layer (in other words, formed on the substrate before the formation of the organic semiconductor layer in a manufacturing process). The first partition portions are formed in the shape of a wall (or the shape of a bank) in such a manner as to separate the two or more organic semiconductor layers provided on the substrate from each other. In other words, the two or more pixels are arranged in the display region on the substrate, and one organic semiconductor layer provided for each pixel is provided in the second concave portions. More specifically, each organic semiconductor layer is surrounded by the first partition portions of the first insulating films. The scanning lines are provided in the first concave portions over the two or more pixels. More specifically, the second partition portions are located on the upper layer side with respect to the first partition portions and are formed in, for example, the shape of a wall (or the shape of a bank) extending along the scanning lines in such a manner as to separate the two mutually adjacent scanning lines from each other. In other words, the scanning lines are provided between the two mutually adjacent second partition portions.

Therefore, when the organic semiconductor layers and the scanning lines are formed by, for example, a printing method, such as a liquid droplet ejecting method (or an ink jet method), in a process for manufacturing the electrooptical device substrate, the organic semiconductor layers and the scanning lines can be patterned using the first insulating film. More specifically, in the manufacturing process, the organic semiconductor layers can be formed in a given pattern by ejecting or applying organic semiconductor layer materials (i.e., organic semiconductor materials for forming the organic semiconductor layers) to the second concave portions by, for example, a printing method, such as a liquid droplet ejecting method. Next, the scanning lines can be formed in a given pattern by ejecting or applying scanning line materials (i.e., conductive materials for forming the scanning lines) to the first concave portions by, for example, a printing method, such as a liquid droplet ejecting method. Therefore, there is no necessity of forming a lyophilic/liquid repellent pattern or forming another partition between the process for forming the organic semiconductor layers by a printing method and the process for forming the scanning lines by a printing method, and each of the organic semiconductor layers and the scanning lines can be formed in a given shape using the first insulating film. Thus, an electrooptical device substrate is provided in which the semiconductor layer formed first is not damaged or the electronic apparatus characteristics do not deteriorate. In addition, the organic semiconductor layers and the scanning lines can be more finely formed by patterning the first insulating film by a photolithography method and an etching method, as compared with the case where the organic semiconductor layers and the scanning lines are patterned using the above-described lyophilic/liquid repellent treatment.

As described above, the aspect of the invention can provide an electrooptical device substrate in which damages caused by the manufacturing process are small, the alignment accuracy of the organic semiconductor layers and the scanning lines on the substrate is high, and the cost is low.

According to an aspect of the electrooptical device substrate of the invention, a second insulating film provided on the scanning line is further provided in such a manner as to fill the first concave portion.

According to this aspect, the second insulating film can almost or completely avoid electrically adverse effects caused by the scanning lines to the pixel electrodes provided at the top layer side in the laminated structure on the substrate. All or some of the pixel electrodes may be formed on the second insulating film.

According to another aspect of the electrooptical device substrate of the invention, the first insulating film contains a second insulating layer having the second concave portion and a first insulating layer provided on the second insulating layer.

According to this aspect, since the first insulating film has a two-layer structure, the degree of freedom of design can be increased as compared with the case where the first insulating film has, for example, a single-layer structure (i.e., containing a single film), and thus it is advantageous in practical use.

According to a still another aspect of the electrooptical device substrate of the invention, the bottom surface of the second concave portion may have lyophilicity to the formation materials of the organic semiconductor layer and a region of the first concave portion in which the second concave portion is not provided may have liquid repellency to the formation materials.

According to this aspect, the formation of the organic semiconductor layer in the second concave portion can be facilitated.

In order to solve the above-described problems, a method for manufacturing an electrooptical device substrate according to an aspect of the invention is a method for manufacturing an electrooptical device substrate having a first insulating film provided on a substrate, two or more pixels, and a thin film transistor matched with one pixel of the two or more pixels, and the method includes: forming the first insulating film in such a manner as to have a first concave portion that is provided over the two or more pixels and that has a second concave portion matched to the one pixel on the bottom surface; forming an organic semiconductor layer in the second concave portion by a printing method; forming a gate insulating film on the organic semiconductor layer; forming a scanning line on the gate insulating film in the first concave portion in such a manner as to cross over the two or more pixel; and forming a pixel electrode matched to the one pixel on an upper layer of the insulating film.

According to the method for manufacturing the electrooptical device substrate of the aspect of the invention, the electrooptical device substrate described above can be manufactured. Here, in particular, the method for manufacturing the electrooptical device substrate according to the aspect of the invention includes a process for forming the first insulating film on the substrate in such a manner as to have the first concave portion that is provided over the two or more pixels and that has the second concave portion matched to the one pixel on the bottom surface. Therefore, the number of times of exposure processes for forming the organic semiconductor layers and the scanning lines can be reduced, and thus the manufacturing cost can be reduced. Furthermore, the alignment accuracy of the organic semiconductor layers and the scanning lines on the substrate can be increased.

The above-described various aspects of the electrooptical device substrate of the invention are also applicable to the aspects of the method for manufacturing the electrooptical device substrate of the invention.

According to an aspect of the method for manufacturing the electrooptical device substrate of the aspect of the invention, a contact hole for electrically connecting the pixel electrode and the organic semiconductor layer is formed in the first insulating film simultaneously with the formation the first concave portions and the second concave portions in the first insulating film in the process for forming the first insulating film.

According to this aspect, the first and second partition portions and the contact hole can be simultaneously formed. Therefore, the alignment accuracy of the organic semiconductor layers and the scanning lines on the substrate can be increased without complicating the manufacturing process.

According to another aspect of the method for manufacturing the electrooptical device substrate of the aspect of the invention, the first concave portion and the second concave portion are formed in the first insulating film using a half-tone mask in the process for forming the first insulating film.

According to this aspect, the first and second partition portions and the contact hole can be formed by one etching treatment. Therefore, the alignment accuracy of the organic semiconductor layers and the scanning lines on the substrate can be increased without complicating the manufacturing process.

In order to solve the problems, an electrooptical device according to an aspect of the invention has the above-described electrooptical device substrate of the invention (including the various aspects thereof).

According to the electrooptical device of the aspect of the invention, the above-described electrooptical device substrate of the invention is provided, and thus a low-cost and highly-reliable electrooptical device can be provided.

In order to solve the above-described problems, an electronic apparatus according to an aspect of the invention has the above-described electrooptical device of the invention (including the various aspects thereof).

According to the electronic apparatus of the aspect of the invention, the above-described electrooptical device of the invention is provided. Thus, various electronic apparatuses capable of performing high definition display, such as a wrist watch, an electronic paper, an electronic note, a cellular phone, and a portable audio device can be realized.

The action and other advantages of the invention are clarified from embodiments for carrying out invention described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. In the following embodiments, an electrophoretic display device of an active-matrix driving system as one example of the electrooptical device of the invention is taken as an example.

First Embodiment

An electrophoretic display device according to a first embodiment will be described with reference to FIGS. 1 to 8.

First, the entire structure of the electrophoretic display device according to this embodiment will be described with reference to FIGS. 1 to 3.

Figure 1:
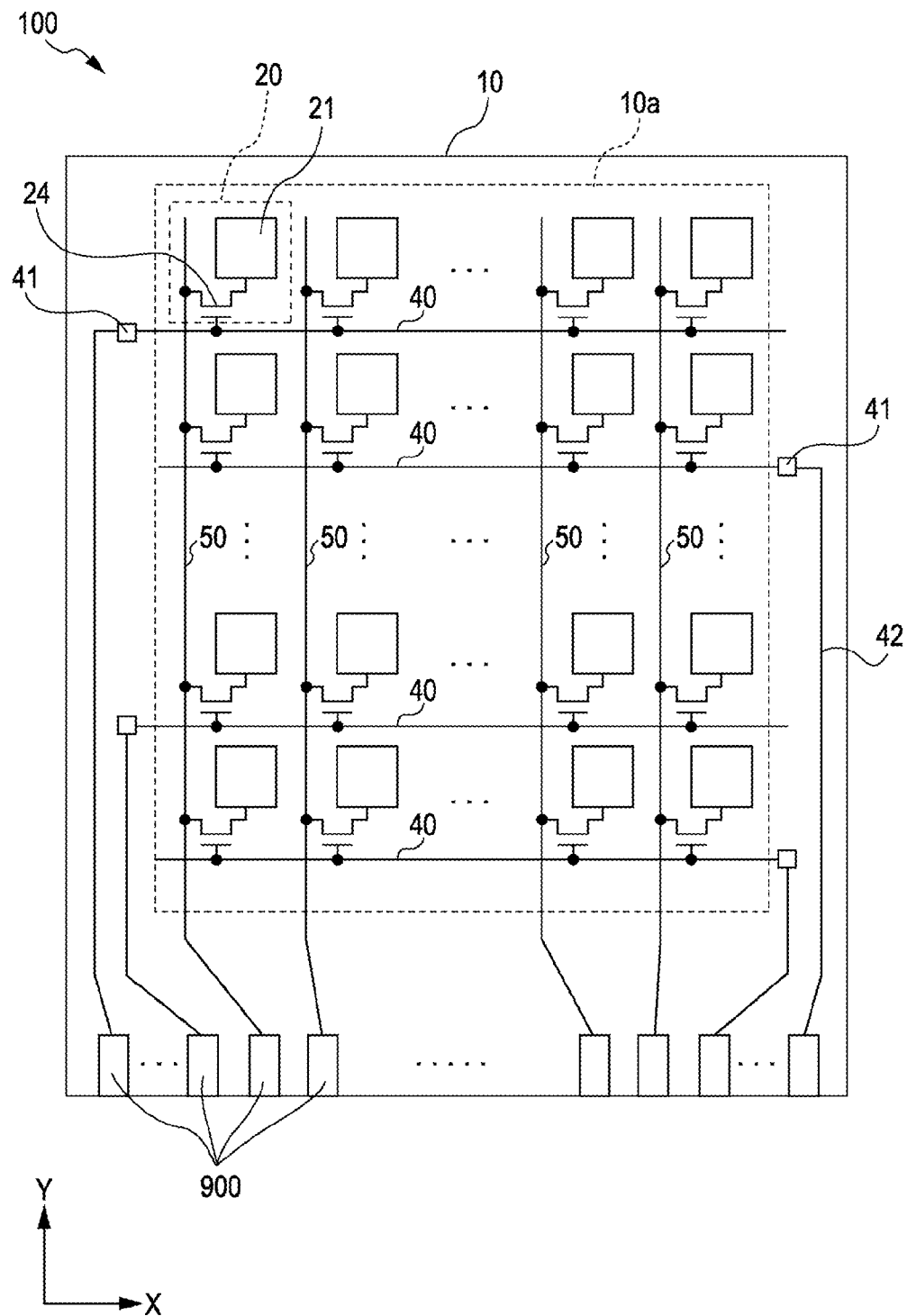
FIG. 1 is a block diagram illustrating the entire structure of an active-matrix substrate of an electrophoretic display device according to a first embodiment.

FIG. 1 is a block diagram illustrating the entire structure of an active-matrix substrate of the electrophoretic display device according to this embodiment.

In FIG. 1, an active-matrix substrate 100 as one example of the "electrooptical device substrate" according to the invention has a support substrate 10, two or more data lines 50 and two or more scanning lines 40 provided on the support substrate 10 in such a manner as to intersect with each other, and a pixel electrode 21 and a TFT 24 provided for each pixel 20 corresponding the intersection of the data lines 50 and the scanning lines 40. Furthermore, the active-matrix substrate 100 has external connection terminals 900, contact terminals 41, and scanning line extension lines 42 on the support substrate 10.

The support substrate 10 is a flexible substrate (i.e., a substrate that can be bend or curve). The flexible substrate may be a glass substrate, a plastic substrate containing, for example, polyethylene terephthalate (PET), polyethylene naphthalate (PEN), polyether sulfone (PES), polycarbonate (PC), aromatic polyester (liquid crystal polymer), polyimide (PI), or the like, a metal substrate containing stainless steel, aluminum, or the like, or a gallium arsenide substrate. The support substrate 10 may not necessarily have flexibility.

The data lines 50 are formed in such a manner as to extend along one direction on the support substrate 10. The data lines 50 are electrically connected to an external drive circuit (not illustrated) through the external connection terminals 900. To the data lines 50, image signals are supplied from the drive circuit at a given timing. As conductive materials constituting the data lines 50, known conductive metal materials can be used. The data lines 50 may be formed with, for example, Cr, Al, Ta, Mo, Nd, Cu, Ag, Au, Pd, In, Ni, Nd, Co, or the like or alloys containing the metals, all known metal materials, alloys thereof, metal oxides thereof, and the like.

The scanning lines 40 are formed in such a manner as to extend in the other direction crossing the one direction, along which the data lines 50 extend, on the support substrate 10. The scanning lines 40 are electrically connected to an external drive circuit (not illustrated) through the contact terminals 41, the scanning line extension lines 42, and the external connection terminals 900. More specifically, one end of each of the scanning lines 40 is electrically connected to each of the scanning line extension line 42 through each of the contact terminals 41 provided in a peripheral region located around a display region 10*a* where the two or more pixels 20 are arranged in the shape of a matrix. The scanning line extension lines 42 are routed in such a manner as to connect the contact terminals 41 and the external connection terminals 900 corresponding to the contact terminals 41 in the peripheral region. To the scanning lines 40, scanning signals are supplied at a given timing from a drive circuit in a pulse manner. As conductive materials constituting the scanning lines 40, known conductive metal materials can be used. The scanning lines 40 may be formed with, for example, Cr, Al, Ta, Mo, Nd, Cu, Ag, Au, Pd, In, Ni, Nd, Co, or the like or alloys containing the metals, all known metal materials, alloys thereof, metal oxides thereof, and the like. The scanning line 40 may also be formed with conductive organic materials, such as conductive polymer poly(3,4-ethylene dioxythiophene) (PEDOT), a carbon paste, a carbon nanotube, and the like.

In the display region 10a on the support substrate 10, the two or more pixels 20 are arranged in the shape of a matrix corresponding to the intersection of the data lines 50 and the scanning lines 40.

The two or more pixels 20 arranged in the shape of a matrix each have the pixel electrode 21 and the TFT 24 for controlling the switching of the pixel electrode 21.

The TFT 24 is an organic TFT having an organic semiconductor layer; the gate of which is electrically connected to the scanning line 40, the source of which is electrically connected to the data line 50, and the drain of which is electrically connected to the pixel electrode 21. The TFT 24 writes image signals supplied from the drive circuit through the data line 50 in the pixel electrode 21 at a timing corresponding to the scanning signals supplied in a pulse manner from the drive circuit through the scanning line 40.

The specific structure of the active-matrix substrate 100 will be described in detail later with reference to FIGS. 4 to 8.

Figure 2:
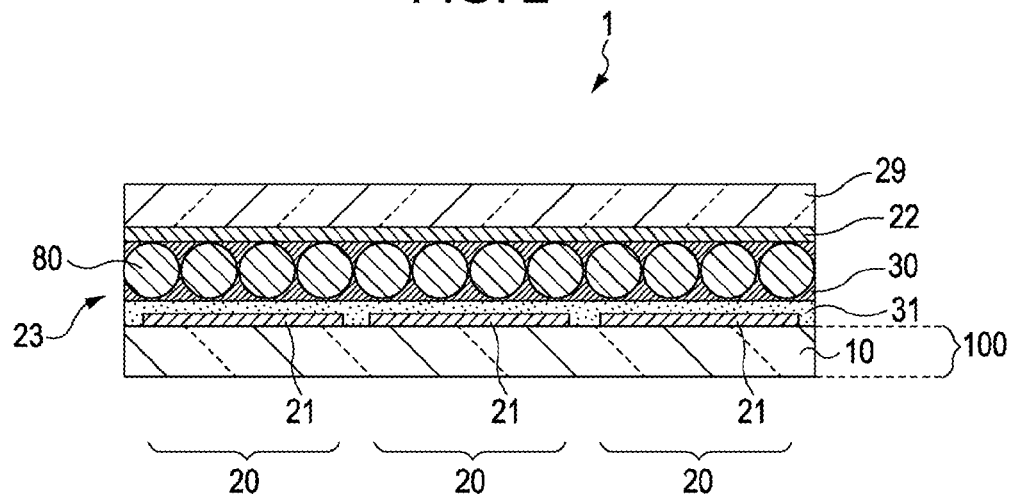
FIG. 2 is a partial cross-sectional view illustrating the structure of a display region of the electrophoretic display device according to the first embodiment.

FIG. 2 is a partial cross-sectional view illustrating the structure in the display region of the electrophoretic display device according to this embodiment. In FIG. 2, in order to recognize each layer and each member in the drawing, the scale is varied for each layer and each member.

In FIG. 2, an electrophoretic display device 1 according to this embodiment has a structure in which an electrophoretic element 23 is held between the active-matrix substrate 100 described above with reference to FIG. 1 and a counter substrate 29. In this embodiment, the description will be given on the premise that images are displayed on the counter substrate 29 side.

In the active-matrix substrate 100, the data lines 50, the scanning lines 40, the TFTs 24, the pixel electrodes 21, and the like described above are provided to form a laminated structure on the support substrate 10. In FIG. 2, the data lines 50, the scanning lines 40, the TFTs 24, and the like are omitted. The pixel electrodes 21 are formed on the top layer side in the laminated structure on the support substrate 10.

The counter substrate 29 is a transparent substrate containing plastic or the like, for example. On the surface opposite to the active-matrix substrate 100 of the counter substrate 29, a common electrode 22 is provided in solid facing the two or more pixel electrodes 21. The common electrode 22 is formed with, for example, transparent conductive materials, such as magnesium silver (MgAg), indium tin oxide (ITO), indium zinc oxide (IZO), and the like.

The electrophoretic element 23 is constituted by two or more microcapsules 80 each containing electrophoretic particles and is fixed between the active-matrix substrate 100 and the counter substrate 29 with a binder 30 and an adhesive layer 31 containing resin or the like. In the electrophoretic display device 1 according to this embodiment, an electrophoretic sheet in which the electrophoretic element 23 is fixed to the counter substrate 29 side with the binder 30 beforehand is adhered to the separately-manufactured active-matrix substrate 100 side with the adhesive layer 31 in the manufacturing process.

The microcapsules 80 are held between the pixel electrodes 21 and the common electrode 22 and one microcapsule 80 or two or more microcapsules 80 are disposed in one pixel 20 (in other words in one pixel electrode 21).

Figure 3:
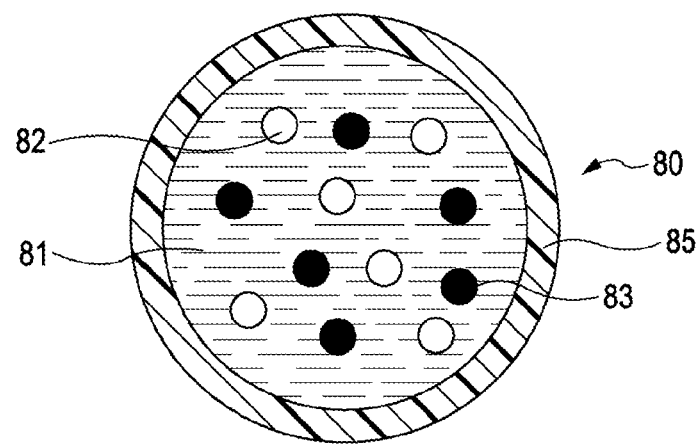
FIG. 3 is a schematic diagram illustrating the structure of a microcapsule.

FIG. 3 is a schematic view illustrating the structure of the microcapsule. FIG. 3 schematically illustrates the cross section of the microcapsule.

In FIG. 3, the microcapsule 80 is constituted by enclosing a dispersion medium 81 and two or more white particles 82 and two or more black particles 83 as the electrophoretic particles inside a coating 85. The microcapsule 80 is formed in a spherical shape having a particle size of about 50 μm, for example.

The coating 85 functions as an outer shell of the microcapsule 80 and is formed with acrylic resin, such as polymethyl methacrylate or polyethyl methacrylate or translucent polymer resin, such as urea resin or gum arabic.

The dispersion medium 81 is a medium that disperses the white particles 82 and the black particles 83 in the microcapsule 80 (in other words in the coating 85). As the dispersion medium 81, water, alcohol solvents, such as methanol, ethanol, isopropanol, butanol, octanol, and methyl cellosolve, various esters, such as ethyl acetate and butyl acetate, ketones, such as acetone, methyl ethyl ketone, and methyl isobutyl ketone, aliphatic hydrocarbons, such as pentane, hexane, and octane, alicylic hydrocarbons, such as cyclohexane and methylcyclohexane, aromatic hydrocarbons, such as benzene, toluene, and benzenes having a long chain alkyl group, such as xylene, hexyl benzene, hebutyl benzene, octyl benzene, nonyl benzene, decyl benzene, undecyl benzene, dodecyl benzene, tridecyl benzene, and tetra-decyl benzene, halogenated hydrocarbons, such as methylene chloride, chloroform, carbon tetrachloride, and 1,2-dichloro ethane, a carboxylate salt, and other oils can be used alone or as a mixture for use. In the dispersion medium 81, a surfactant may be blended.

The white particles 82 are, for example, particles (polymer or colloid) containing white pigments, such as a titanium dioxide, zinc flower (zinc oxide), and antimony trioxide, and are negatively charged, for example.

The black particles 83 are, for example, particles (polymer or colloid) containing a black pigment, such as aniline black and carbon black, and are positively charged, for example.

Therefore, the white particles 82 and the black particles 83 can move in the dispersion medium 81 due to an electric field generated by a potential difference between the pixel electrodes 21 and the common electrode 22.

To the pigments, a charge control agent containing particles of an electrolyte, a surfactant, a metal soap, resin, rubber, oil, varnish, or a compound; a dispersant, such as a titanium coupling agent, an aluminum coupling agent, or a silane coupling agent; a lubricant; a stabilizer; or the like can be added as required.

In FIGS. 2 and 3, when a voltage is applied between the pixel electrodes 21 and the common electrode 22 so that the potential of the common electrode 22 is relatively high, the positively charged black particles 83 are attracted to the pixel electrodes 21 in the microcapsule 80 due to the Coulomb force and the negatively charged white particles 82 are attracted to the common electrode 22 in the microcapsule 80 due to the Coulomb force. As a result, the white particles 82 gather on the display surface side (i.e., the common electrode 22 side) in the microcapsule 80, and thus the color (i.e., white) of the white particles 82 can be displayed on the display surface of the electrophoretic display device 1. In contrast, when a voltage is applied between the pixel electrodes 21 and the common electrode 22 so that the potential of the pixel electrodes 21 is relatively high, the negatively charged white particles 82 are attracted to the pixel electrodes 21 in the microcapsule 80 due to the Coulomb force and the positively charged black particles 83 are attracted to the common electrode 22 in the microcapsule 80 due to the Coulomb force. As a result, the black particles 83 gather on the display surface side of the microcapsule 80, and thus the color (i.e., black) of the black particle 83 can be displayed on the display surface of electrophoretic display device 1.

In addition, it is possible to display gray color, such as light gray, gray, or dark gray, which is a halftone between white color and black color depending on a dispersion state of the white particles 82 and the black particles 83 between the pixel electrodes 21 and the common electrode 22. Moreover, by replacing the pigments used for the white particles 82 and the black particles 83 with, for example, pigments of red color, green color, blue color, and the like, it is possible to perform color display, such as red color, green color, blue color, and the like.

Next, the specific structure of the active-matrix substrate according to this embodiment will be described with reference to FIGS. 4 to 8.

Figure 4:
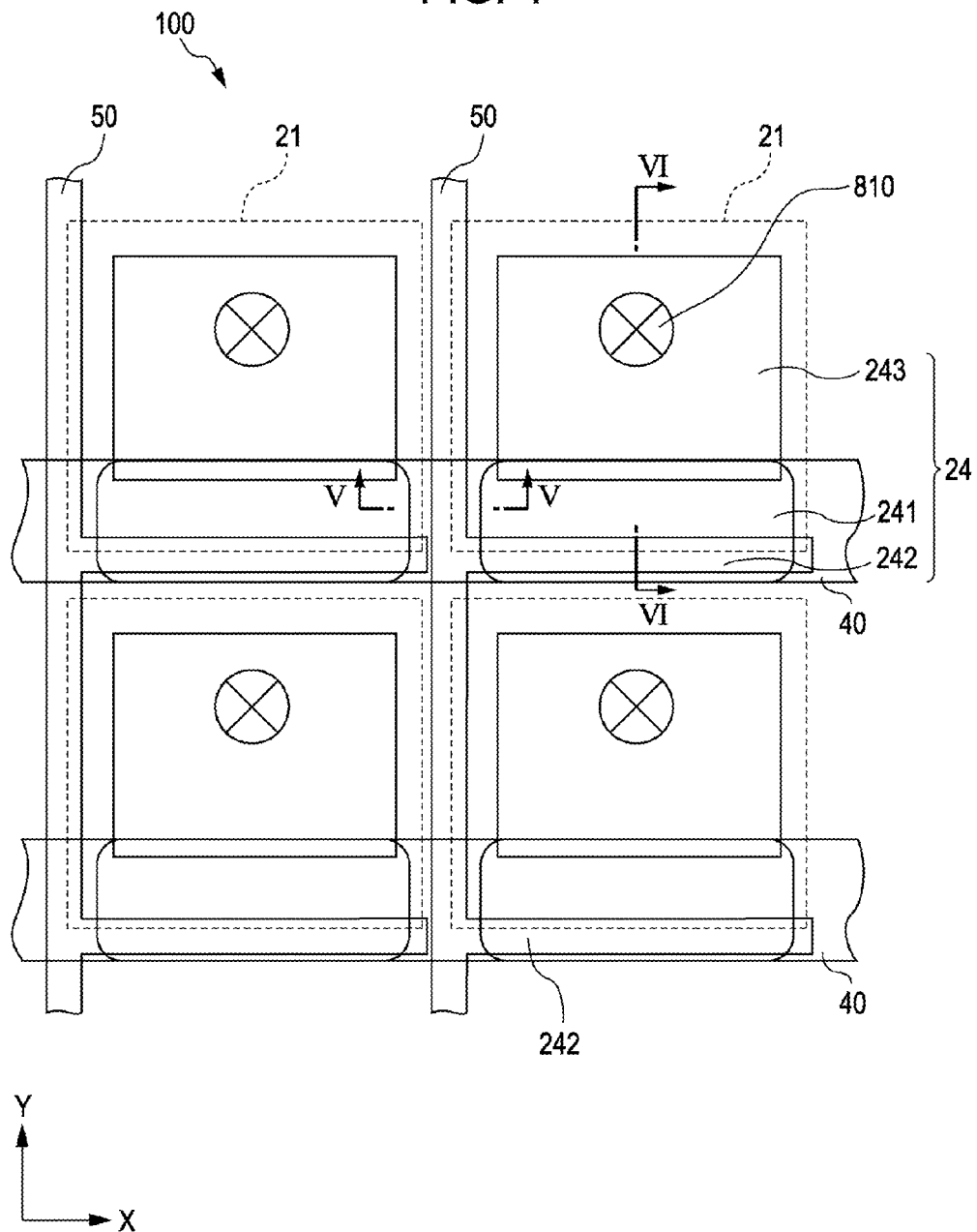
FIG. 4 is a plan view illustrating the specific structure of the active-matrix substrate according to the first embodiment.
Figure 5:
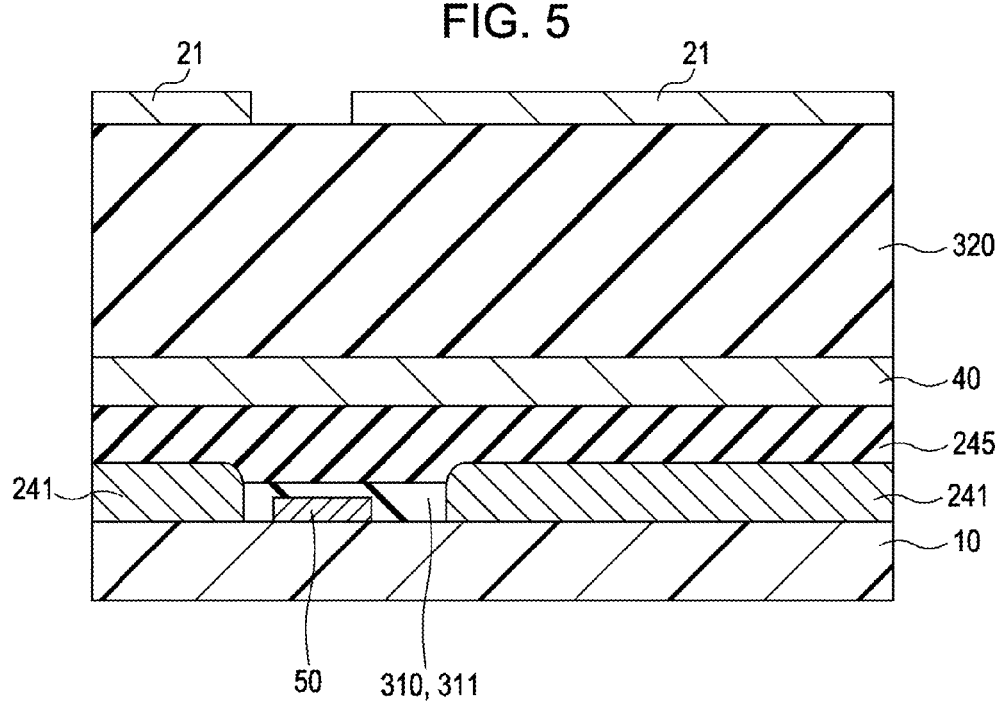
FIG. 5 is a cross sectional view along the V-V line of FIG. 4.
Figure 6:
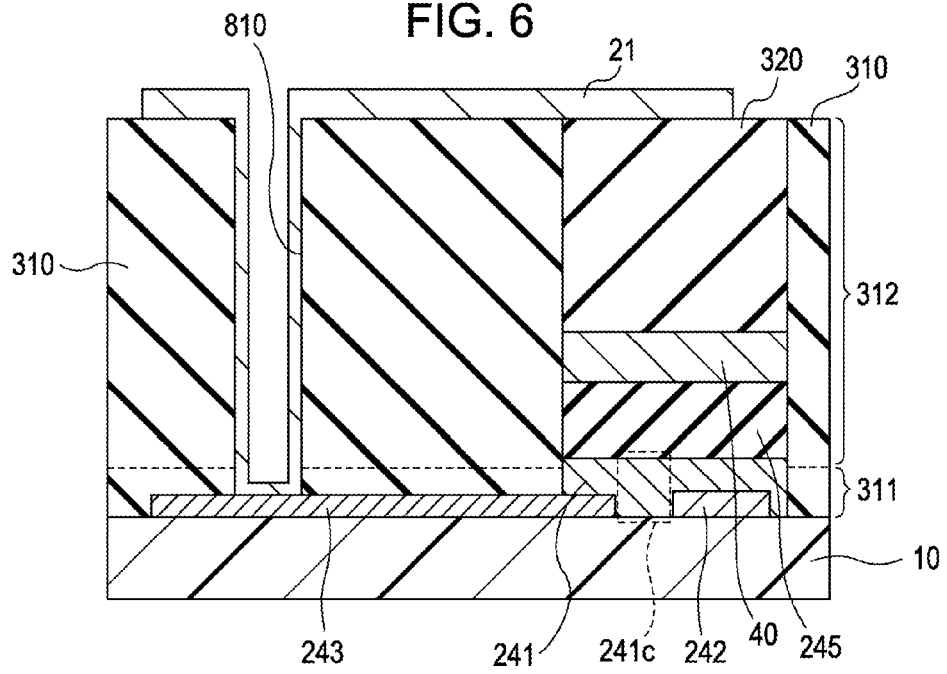
FIG. 6 is a cross sectional view along the VI-VI line of FIG. 4.

FIG. 4 is a plan view illustrating the specific structure of the active-matrix substrate according to this embodiment. FIG. 5 is a cross sectional view along the V-V line of FIG. 4. FIG. 6 is a cross sectional view along the VI-VI line of FIG. 4. In FIG. 4, for convenience of the description, a gate insulating film 245, a first interlayer insulating film 310, and a second interlayer insulating film 320 are omitted.

In FIGS. 4 to 6, in the active-matrix substrate 100, the data lines 50, the scanning lines 40, the TFTs 24, the pixel electrodes 21, and the like described above with reference to FIG. 1 are provided to form a laminated structure on the support substrate 10.

The support substrate 10 is a flexible substrate, such as a plastic substrate, as described above.

As illustrated in FIG. 4, two or more data lines 50 and two or more scanning lines 40 are provided in such a manner as to intersect with each other on the support substrate 10. Furthermore, on the support substrate 10, the pixel electrodes 21 and the TFTs 24 are provided for each pixel corresponding to the intersection of the data lines 50 and the scanning lines 40. The TFT 24 contains a semiconductor layer 241, a source electrode 242, and a drain electrode 243.

Hereinafter, each component on the support substrate 10 will be described in order from the lower layer side in the laminated structure on the support substrate 10.

In FIGS. 4 to 6, the data line 50, the source electrode 242, and the drain electrode 243 are formed on the same layer in the laminated structure on the support substrate 10.

The data line 50, the source electrode 242, and the drain electrode 243 are formed by patterning of a metal film formed on the same opportunity in the manufacturing process and contain the same kind of a metal film. As the metal film constituting the data line 50, the source electrode 242, and the drain electrode 243, Cr, Al, Ta, Mo, Nd, Cu, Ag, Au, Pd, In, Ni, Nd, Co, and the like can be used, for example. The data line 50, the source electrode 242, and the drain electrode 243 may be formed with ITO, ZuO2, or the like. The data line 50, the source electrode 242, and the drain electrode 243, may be formed with a conductive organic material, such as conductive polymer poly(3,4-ethylene dioxythiophene) (PEDOT), a carbon paste, or a carbon nanotube and may be formed by, for example, a printing method, such as a liquid droplet ejecting method, a screen printing method, or a microcontact printing method.

The data line 50 is formed in such a manner as to extend along one direction on the support substrate 10.

The source electrode 242 is formed for each pixel in such a manner as to extend along another direction crossing the one direction along which the data line 50 extends on the support substrate 10. The source electrode 242 is formed in such a manner as to branch from each data line 50 for each corresponding pixel.

The drain electrode 243 is formed in the shape of an island for each pixel.

In FIG. 6, first interlayer insulating films 310 are formed at the upper side with respect to the source electrode 242 and the drain electrode 243.

The first interlayer insulating films 310 contain an insulator material and have a first partition portion 311 that separates the mutually adjacent semiconductor layers 241 and a second partition portion 312 that separates the mutually adjacent scanning lines 40. The second partition portion 312 is formed at the upper side with respect to the first partition portion 311. Insulator materials constituting the first interlayer insulating films 310 are preferably insulating polymers. As the insulating polymers, polyvinyl phenol or phenol resin (another name: novolac resin) may be used as the main skeleton. In addition, polyvinylphenol, acrylic resin, such as polymethyl methacrylate, polycarbonate, polystyrene, polyolefin, polyvinyl alcohol, polyimide, fluororesin, polyparaxylylene, benzocyclobutene, and the like can be used. Furthermore, a photosensitive function can added by the use of an epoxy crosslinking agent or a radical photopolymerization initiator, and thus patterning can be directly performed without using a resist or the like.

Figure 7:
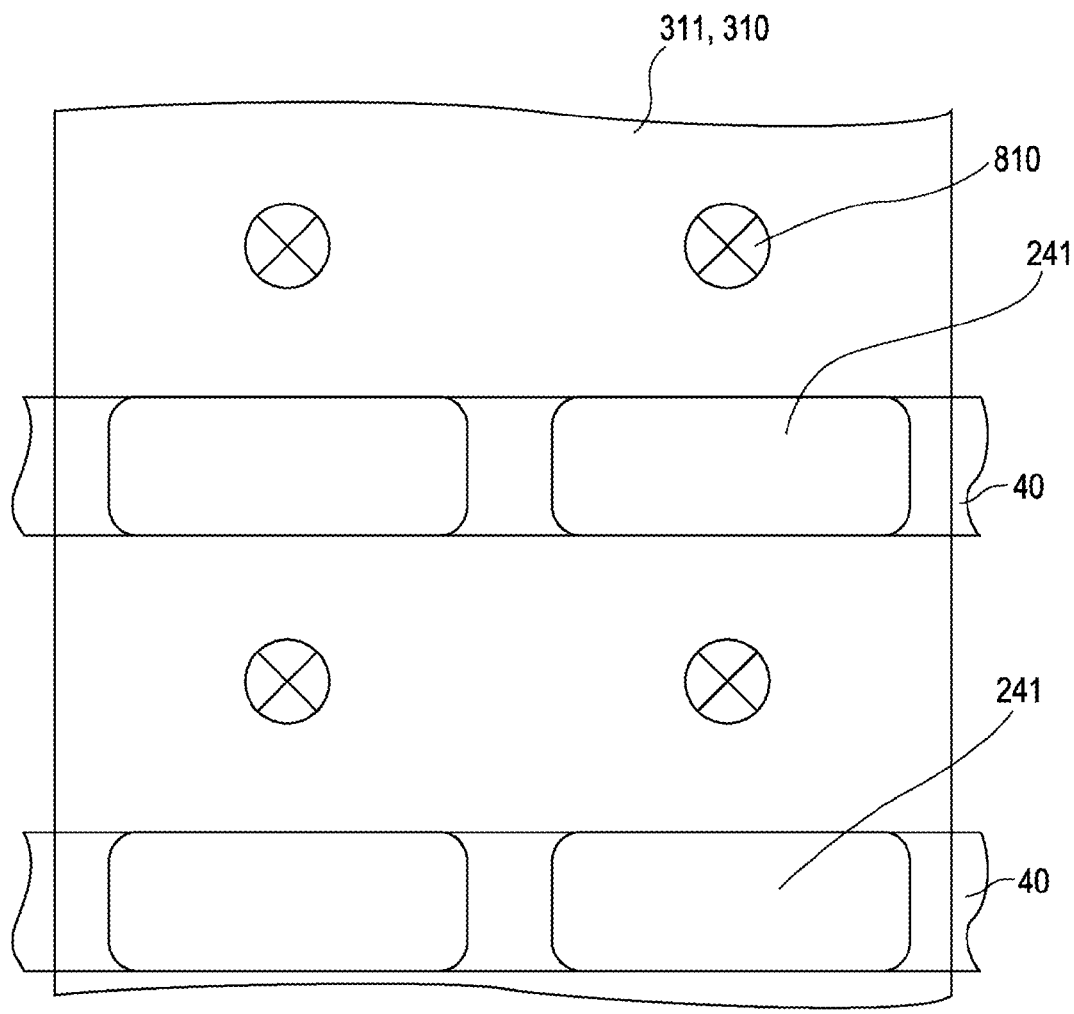
FIG. 7 is a plan view illustrating the structure of a first partition portion according to the first embodiment.

FIG. 7 is a plan view illustrating the structure of the first partition portion 311.

As illustrated in FIGS. 5 to 7, the first partition portion 311 is a wall or a bank that separates the mutually adjacent two or more semiconductor layers 241 from each other. Specifically, the first partition portion 311 is formed in such a manner as to surround each region where the semiconductor layer 241 is formed on the support substrate 10. In other words, the first partition portion 311 is formed in such a manner as to form a concave portion in which the semiconductor layer 241 is formed for each pixel on the support substrate 10.

In FIGS. 5 and 6, the first partition portion 311 has substantially the same film thickness as the film thickness of the semiconductor layer 241. The semiconductor layer 241 has a film thickness of about 2 nm to 1 um (preferably about 500 nm), for example. In order to surely form the semiconductor layer 241 in the concave portion surrounded by the first partition portion 311, it is preferable for the surface of the partition portion to have liquid repellency to the organic semiconductor materials and for the bottom surface of the concave portion to have lyophilicity thereto.

Figure 8:
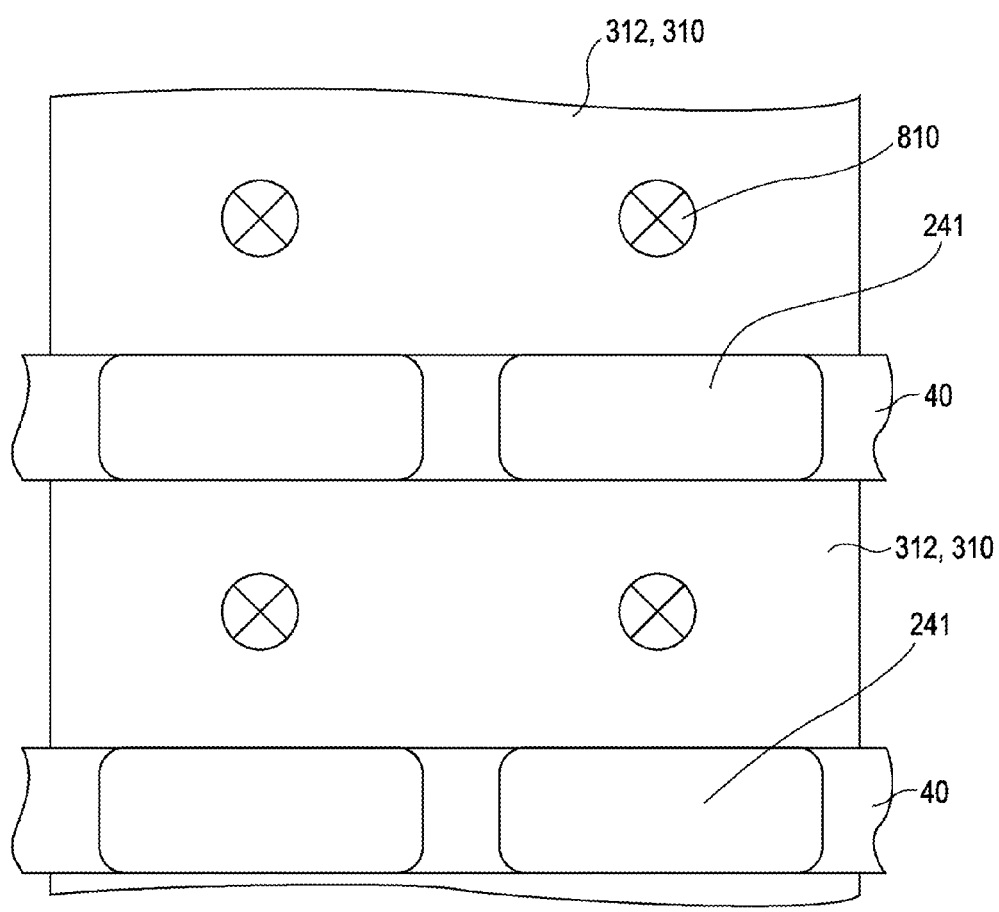
FIG. 8 is a plan view illustrating the structure of a second partition portion according to the first embodiment.

FIG. 8 is a plan view illustrating the structure of the second partition portion 312.

As illustrated in FIGS. 6 and 8, the second partition portion 312 is a wall or a bank that separates the two mutually adjacent scanning lines 40 from each other. In other words, the second partition portion 312 is a wall or a bank that extends in the direction in which the scanning lines 40 extend, and one scanning line 40 is provided between the two mutually adjacent second partition portions 312.

In other words, the scanning lines 40 are formed in the first concave portions provided in the first interlayer insulating film 310 over the two or more pixels. The semiconductor layer 241 is formed in the second concave portion provided for each pixel on the bottom surface of the first concave portions.

In FIGS. 4 to 7, the semiconductor layer 241 constituting the TFT 24 is an organic semiconductor layer which is formed by ejection or application of organic semiconductor materials to the concave portion surrounded by the first partition portion 311 on the support substrate 10 by, for example, a printing method, such as a liquid droplet ejecting method or a screen-printing method. Examples of the organic semiconductor materials include low molecular weight organic semiconductor materials, such as naphthalene, anthracene, tetracene, pentacene, hexacene, phthalocyanine, perylene, hydrazone, triphenylmethane, diphenylmethane, stilbene, aryl vinyl, pyrazoline, triphenylamine, triarylamine, oligothiophene, phthalocyanine, or derivatives thereof; and polymer organic semiconductor materials, such as poly(N-vinylcarbazole), polyvinylpyrene, polyvinylanthracene, polythiophene, polyhexylthiophene, poly(p-phenylenevinylene), polythienylenevinylene, polyarylamine, pyrene formaldehyde resin, ethylcarbazole formaldehyde resin, fluorene-bithiophene copolymer, fluorene-arylamine copolymer, or derivatives thereof. One or a combination of two or more of the above materials can be used.

The semiconductor layer 241 has a channel region 241c (FIG. 6), a source region adjacent to the channel region 241c and electrically connected to the source electrode 242, and a drain region adjacent to the channel region 241c and electrically connected to the drain electrode 243.

The scanning line 40 is formed at the upper side with respect to the semiconductor layer 241 through the gate insulating film 245.

In FIGS. 4 to 6, the gate insulating film 245 is formed between the two mutually adjacent second partition portions 312 and is overlapped with the corresponding two or more semiconductor layers 241 as viewed in plane on the support substrate 10. The gate insulating film 245 is formed by ejection or application of insulating liquid materials by, for example, a printing method, such as a liquid droplet ejecting method, between the two mutually adjacent second partition portions 312 of the first interlayer insulating films 310 on the support substrate 10. As is seen from FIGS. 5 and 6, the gate insulating film 245 is formed on the semiconductor layers 241 and the first partition portion 311. As insulating materials constituting the gate insulating film 245, organic materials, such as a polyolefin polymer typified by polyvinyl phenol, polyimide, polymethyl methacrylate, polystyrene, polyvinyl alcohol, polyvinyl acetate, or polyisobutylene or copolymers thereof, can be used.

In FIGS. 4 to 6 and FIG. 8, the scanning line 40 is formed between the two mutually adjacent second partition portions 312 in such a manner as to be overlapped with the gate insulating film 245 and has the same plane shape as that of the gate insulating film 245. More specifically, the scanning line 40 is overlapped with the corresponding two or more semiconductor layers 241 on the support substrate 10 as viewed in plane. A portion of the scanning line 40 that is overlapped with the channel region 241c of the semiconductor layer 241 functions as a gate electrode of the TFT 24. More specifically, the TFT 24 is formed as a top gate organic TFT. The scanning line 40 is formed by ejection or application of conductive liquid materials between the two mutually adjacent second partition portions 312 by, for example, a printing method, such as a liquid droplet ejecting method. As the conductive liquid materials, a water dispersion of PEDOT (polyethylene dioxythiophene) can be used. In addition, a metal colloid can be used other than the PEDOT. These dispersions contain water as the main ingredients, but a liquid to which alcohol is added may be used. The scanning lines 40 have a film thickness of, for example, 100 nm to 2 μm.

In FIGS. 5 and 6, the second interlayer insulating film 320 is provided at the upper side with respect to the scanning line 40. The second interlayer insulating film 320 has the same plane shape as those of the gate insulating film 245 and the scanning line 40. The second interlayer insulating film 320 is formed in such a manner as to fill a space on the scanning line 40 between the two mutually adjacent second partition portions 312. The second interlayer insulating film 320 is formed by ejection or application of insulating liquid materials at the upper side with respect to the scanning line 40 between the two mutually adjacent second partition portions 312 of the first interlayer insulating films 310 by, for example, a printing method, such as a liquid droplet ejecting method. Insulator materials constituting the second interlayer insulating film 320 are preferably insulating polymers similarly as in the first interlayer insulating film 310 described above.

In FIGS. 4 to 6, the pixel electrode 21 is formed for each pixel on the first interlayer insulating film 310 and the second interlayer insulating film 320. The pixel electrodes 21 are electrically connected to the drain electrode 243 through a contact hole (or via hole) 810 that is made to open in the first interlayer insulating film 310. Materials constituting the pixel electrodes 21 are not particularly limited in the type insofar as they are known electrode materials. Specifically, simple metals, such as Cr, Al, Ta, Mo, Nd, Cu, Ag, Au, Pd, In, Ni, Nd, or Co or alloys containing the metals, all known metal materials, and alloys thereof or metal oxides thereof can be used, for example. In addition, a solution in which metal fine particles are dispersed, a polymer mixture containing conductive particles, or a conductive organic material may be employed as electrode materials.

Particularly in this embodiment, the active-matrix substrate 100 has the first interlayer insulating film 310 having the first partition portion 311 and the second partition portion 312 as described above with reference to FIGS. 6 to 8. Therefore, in a process for manufacturing the active-matrix substrate 100, when the semiconductor layer 241, the gate insulating film 245, and the scanning line 40 are formed by, for example, a printing method, such as a liquid droplet ejecting method, a screen-printing method, or a microcontact printing method, the semiconductor layer 241, the gate insulating film 245, and the scanning line 40 can be patterned using the first interlayer insulating film 310. More specifically, by first ejecting or applying organic semiconductor materials to a region surrounded by the first partition portions 311 of the first interlayer insulating films 310 by, for example, a printing method, such as a liquid droplet ejecting method, in the manufacturing process, the semiconductor layer 241 can be formed in a given pattern. Next, by ejecting or applying insulating liquid materials between the two mutually adjacent second partition portions 312 of the first interlayer insulating films 310 by, for example, a printing method, such as a liquid droplet ejecting method, the gate insulating film 245 can be formed in a given pattern. Subsequently, by ejecting or applying conductive liquid materials between the two mutually adjacent second partition portions 312 of the first interlayer insulating films 310 by, for example, a printing method, such as a liquid droplet ejecting method, the scanning line 40 can be formed in a given pattern. When a photosensitive resin is used as the first interlayer insulating film 310, and is exposed using, for example, a half-tone mask during patterning by a photolithography method or an etching method, the first interlayer insulating film 310 according to the embodiment of the invention can be formed by one exposure process. Therefore, each of the semiconductor layer 241, the gate insulating film 245, and the scanning line 40 can be formed in a given pattern using the first interlayer insulating film 310 without performing another exposure process after the exposure process. Thus, the number of times of performing the exposure processes can be reduced. Therefore, the support substrate 10 containing, for example, a plastic substrate or the like can be suppressed or prevented from contracting due to heat during the exposure process. Thus, the alignment accuracy of the semiconductor layer 241, the gate insulating film 245, and the scanning line 40 on the support substrate 10 can be increased. Furthermore, since the number of times of performing the exposure processes can be reduced, the manufacturing cost can also be reduced. In addition, by patterning the first interlayer insulating film 310 by a photolithography method and an etching method, the semiconductor layer 241, the gate insulating film 245, and the scanning line 40 can be more finely formed as compared with, for example, the case where the semiconductor layer 241, the gate insulating film 245, and the scanning line 40 are patterned using, for example, the above-described lyophilic/liquid repellent treatment.

Furthermore, particularly in this embodiment, the active-matrix substrate 100 has the second interlayer insulating film 320 provided at the upper side with respect to the scanning line 40 in such a manner as to fill a space between the two mutually adjacent second partition portions 312 as described above with reference to FIGS. 5 and 6. Therefore, the second interlayer insulating film 320 can almost or completely avoid electrically adverse effects caused by the scanning lines 40 to the pixel electrodes 21 provided on the top layer side in the laminated structure on the support substrate 10.

As a modification of this embodiment, the active-matrix substrate 100 may have a two-layer structure in which the first interlayer insulating film 310 has a first insulating layer forming the first partition portion 311 and a second insulating layer forming the second partition portion 312. More specifically, the first partition portion 311 and the second partition portion 312 may be formed as different films. In this case, since the first interlayer insulating film 310 has a two-layer structure, the degree of freedom of design can be increased as compared with the case of a single-layer structure (i.e., containing a single film), and thus it is advantageous in practical use. For example, in order to surely form the semiconductor layer 241 in the concave portion surrounded by the first partition portions 311, it is preferable for the surface of the partition portion to have liquid repellency to organic semiconductor materials and for the bottom surface of the concave portion to have lyophilicity thereto as previously described above. When forming the gate insulating film 245 on the semiconductor layer 241, it is desirable for the surface of the first partition portion 311 to have lyophilicity to insulating liquid materials and for the surface of the second partition portion 312 to have liquid repellency thereto. When the first interlayer insulating film 310 has a laminated structure containing the first insulating layer forming the first partition portion 311 and the second insulating layer forming the second partition portion 312, the properties of the surface of the first partition portion 311 and the properties of the surface of the second partition portion 312 are easily made different from each other according to the organic semiconductor materials and the insulating liquid materials, and thus the formation of the semiconductor layer 241 or the gate insulating film 245 is facilitated.

As described above, according to the active-matrix substrate 100 of this embodiment, low-cost manufacturing can be achieved and the alignment accuracy of the semiconductor layer 241, the gate insulating film 245, and the scanning line 40 on the support substrate 10 can be increased.

Next, a method for manufacturing the active-matrix substrate 100 according to this embodiment described above will be described with reference to FIGS. 9A to 10C.

FIGS. 9A to 10C are cross sectional views of a process flow illustrating main processes of the method for manufacturing the active-matrix substrate according to this embodiment in order. FIGS. 9A to 10C are illustrated corresponding to the cross sectional view illustrated in FIG. 6.

Figure 9A:
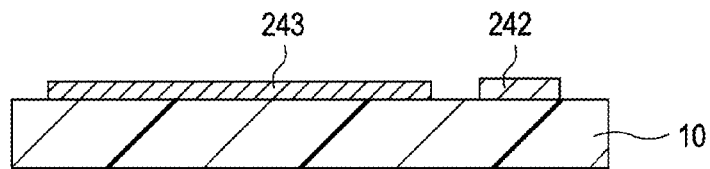
FIGS. 9A to 9C are cross sectional views of a process flow (No. 1) illustrating main processes of a method for manufacturing the active-matrix substrate according to the first embodiment in order.

First, in a process illustrated in FIG. 9A, the data line 50 (FIGS. 4 and 5), the source electrode 242, and the drain electrode 243 each are formed in a given pattern on the support substrate 10. Specifically, a metal film is formed by vapor deposition or sputtering on the entire surface on the support substrate 10, and then the metal film is patterned by a photolithography method and an etching method to thereby form the data line 50, the source electrode 242, and the drain electrode 243.

Figure 9B:
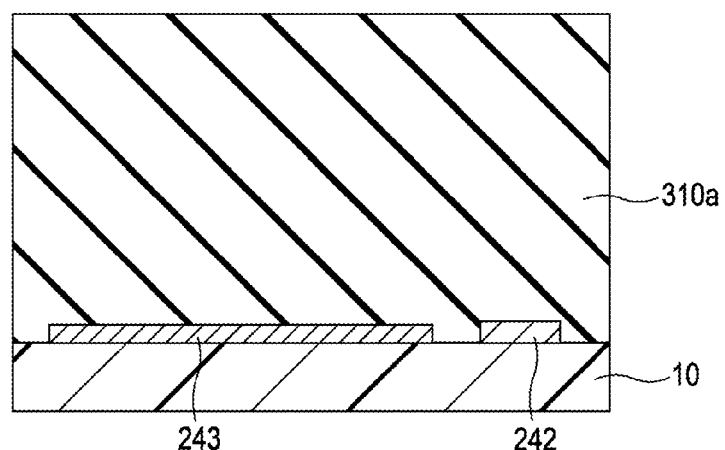

Next, in a process illustrated in FIG. 9B, an insulating film 310a is formed on the entire surface on the support substrate 10 by applying a photosensitive resin by, for example, a printing method, a spin coat method, a bar coat method, or the like. In the process, the insulating film 310a is formed in such a manner as to have a film thickness of, for example, 3 μm to 5 μm.

Figure 9C:
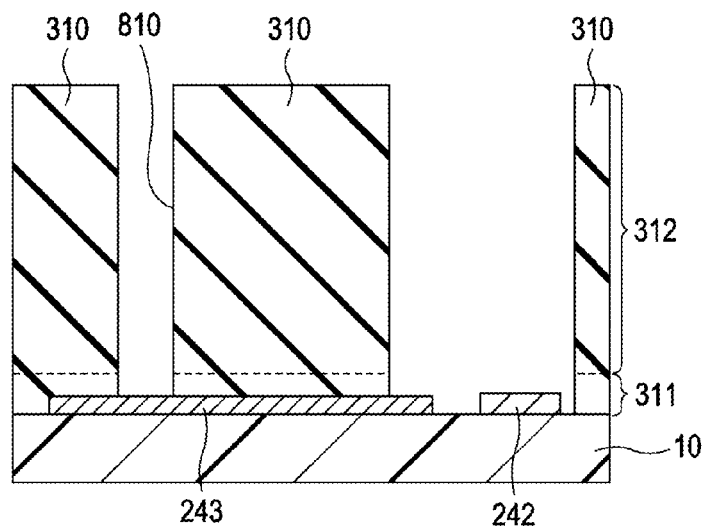

Next, in a process illustrated in FIG. 9C, the first interlayer insulating film 310 is formed by patterning the insulating film 310a using a half-tone mask in one exposure process. By the process, the first interlayer insulating film 310 can be formed in such a manner as to have the first partition portion 311 and the second partition portion 312 described with reference to FIGS. 5 to 8. The first partition portion 311 is formed in such a manner as to have substantially the same film thickness as the film thickness of the semiconductor layer 241 which is formed later (The first partition portion 311 preferably has a film thickness equal to or lower than that of the semiconductor layer 241.). Furthermore, in this process, the contact hole 810 is simultaneously formed with the formation of the first interlayer insulating film 310. Thus, the first partition portion 311, the second partition portion 312, and the contact hole 810 can be formed by one etching treatment. Therefore, an increase in the number of processes in the manufacturing process can be suppressed.

Figure 10A:
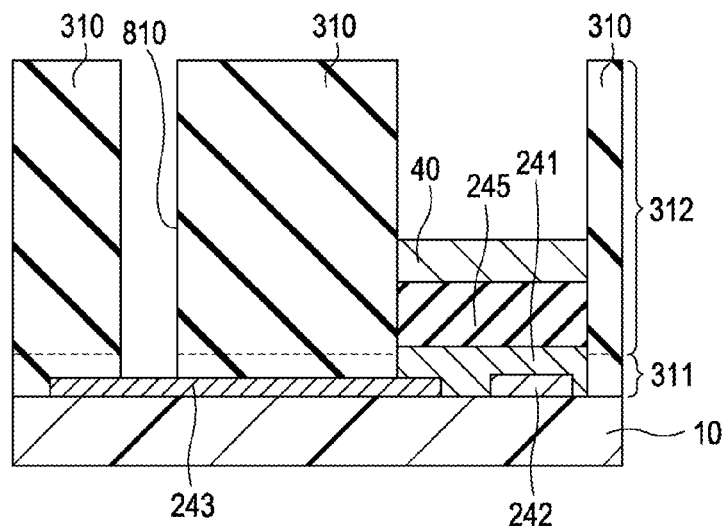
FIGS. 10A to 10C are cross sectional views of a process flow (No. 2) illustrating main processes of the method for manufacturing the active-matrix substrate according to the first embodiment in order.

Next, in a process illustrated in FIG. 10A, the source electrode 242, the drain electrode 243, and the support substrate 10 are subjected to surface modification treatment by performing plasma treatment using oxygen (O2) gas or the like. In the process, the surface of each of the source electrode 242, the drain electrode 243, and the support substrate 10 is modified in such a manner as to have lyophilicity to an organic semiconductor material which is a liquid for forming the semiconductor layer 241 later. Subsequently, the semiconductor layer 241 is formed by ejecting or applying an organic semiconductor material by, for example, a printing method, such as a liquid droplet ejecting method, to a concave portion surrounded by the first partition portions 311 on the support substrate 10 (also see FIG. 7). Subsequently, the gate insulating film 245 is formed by ejecting or applying an insulating liquid material by, for example, a printing method, such as a liquid droplet ejecting method, between the two mutually adjacent second partition portions 312 of the first interlayer insulating films 310 on the support substrate 10 (also see FIG. 8). Next, the scanning line 40 is formed on the gate insulating film 245 by ejecting or applying a conductive liquid material by, for example, a printing method, such as a liquid droplet ejecting method, between the two mutually adjacent second partition portions 312 of the first interlayer insulating films 310 on the support substrate 10 (also see FIG. 8).

Figure 10B:
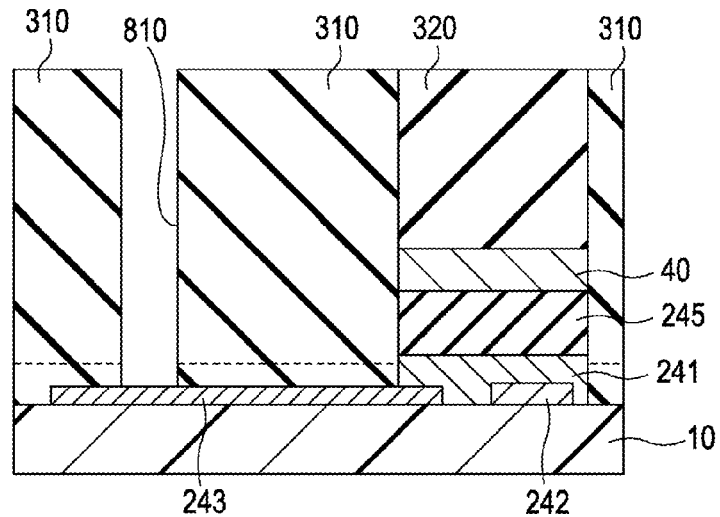

Next, in a process illustrated in FIG. 10B, the second interlayer insulating film 320 is formed by ejecting or applying an insulating liquid material by, for example, a printing method, such as a liquid droplet ejecting method, to the upper side with respect to the scanning line 40 between the two mutually adjacent second partition portions 312 of the first interlayer insulating films 310. In the process, the second interlayer insulating film 320 is formed in such a manner as to fill a space on the scanning line 40 between the two mutually adjacent second partition portions 312.

Figure 10C:
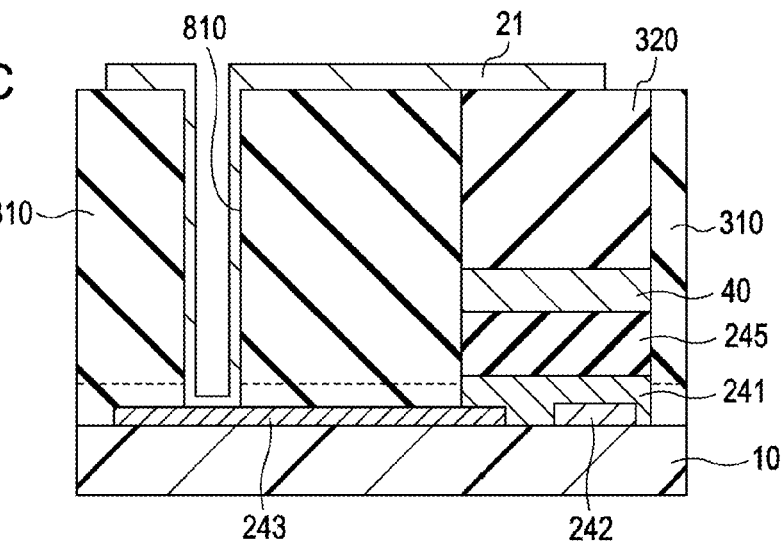

Next, in a process illustrated in FIG. 10C, the pixel electrode 21 is formed for each pixel on the first interlayer insulating film 310 and the second interlayer insulating film 320. In the process, the pixel electrode 21 is formed in such a manner as to be electrically connected to the drain electrode 243 through the contact hole 810 that is made to open in the first interlayer insulating film 310. The pixel electrode 21 may be formed by a photolithography method and an etching method or may be formed by a lift-off method and a mask vapor deposition method. Or, the pixel electrode 21 may be formed by, for example a printing method, such as a liquid droplet ejecting method, a screen printing method, and a microcontact printing method.

Thus, the active-matrix substrate 100 according to this embodiment can be manufactured. Here, particularly, this embodiment includes the process for forming the first interlayer insulating film 310 in such a manner as to have the first partition portion 311 for separating the two or more mutually adjacent semiconductor layers 241 and the second partition portion 312 for separating the two mutually adjacent scanning lines 40 on the support substrate 10 (FIGS. 9B and 9C). Therefore, the number of times of performing exposure processes for forming the semiconductor layer 241, the gate insulating film 245, and the scanning line 40 can be reduced and the manufacturing cost can be reduced. Furthermore, the alignment accuracy of the semiconductor layer 241, the gate insulating film 245, and the scanning line 40 on the support substrate 10 can be increased.

Second Embodiment

An active-matrix substrate according to a second embodiment will be described with reference to FIG. 11.

Figure 11:
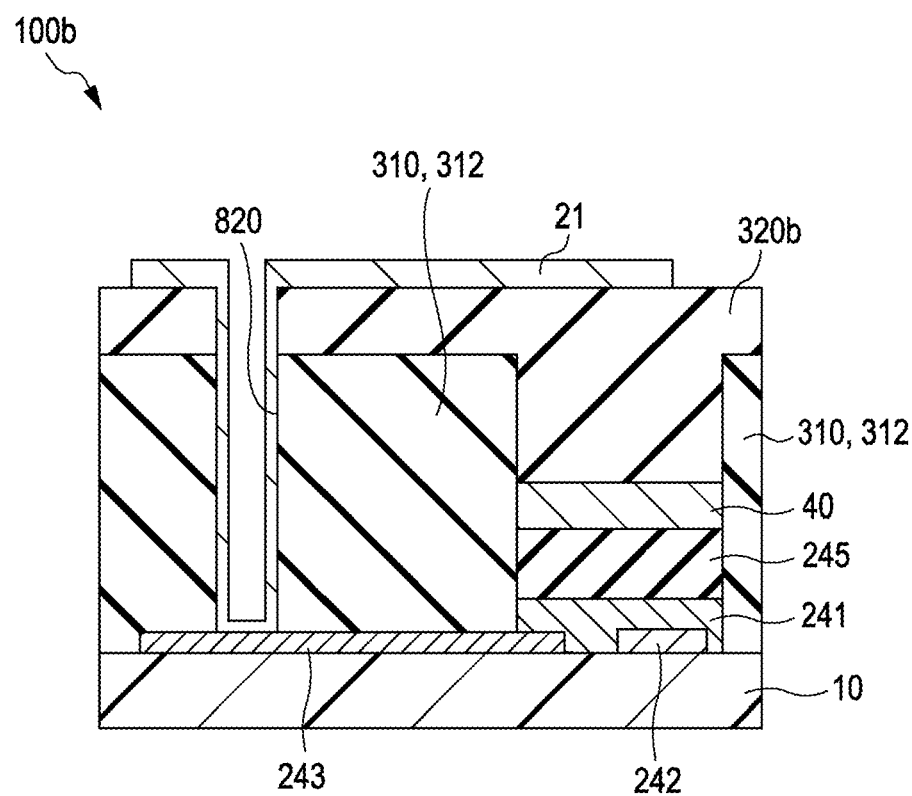
FIG. 11 is a cross sectional view along the VI-VI line of FIG. 4 similarly as in FIG. 6 in a second embodiment.

FIG. 11 is a cross sectional view along the line VI-VI line similarly as in FIG. 6 in a second embodiment. In FIG. 11, the same components as those of the first embodiment illustrated in FIG. 6 are designated by the same reference numerals and the descriptions thereof will be omitted as appropriate.

In FIG. 11, an active-matrix substrate 100b according to the second embodiment is different from the active-matrix substrate 100 according to the first embodiment described above in that a second interlayer insulating film 320b is provided in place of the second interlayer insulating film 320 in the first embodiment described above. In other respects, the active-matrix substrate 100b is constituted in substantially the same manner as in the active-matrix substrate 100 according to the first embodiment described above.

In FIG. 11, the second interlayer insulating film 320b fills a space on the scanning line 40 between the two mutually adjacent second partition portions 312 and also is provided on the first interlayer insulating films 310. The pixel electrode 21 is formed for each pixel on the second interlayer insulating film 320b. The pixel electrode 21 is electrically connected to the drain electrode 243 through a contact hole (or via hole) 820 which penetrates the second interlayer insulating film 320b and the first interlayer insulating film 310.

In this case, when the second interlayer insulating film 320 is formed by, for example, a liquid droplet ejecting method, the second interlayer insulating film 320 having high flatness can be formed. Thus, in this point, the active-matrix substrate according to the second embodiment is more advantageous than the active-matrix substrate illustrated in the first embodiment.

Electronic Apparatus

Next, an electronic apparatus to which the electrophoretic display device described above is applied will be described with reference to FIGS. 12 and 13. Hereinafter, the case where the electrophoretic display device described above is applied to an electronic paper and an electronic note is taken as an example.

Figure 12:
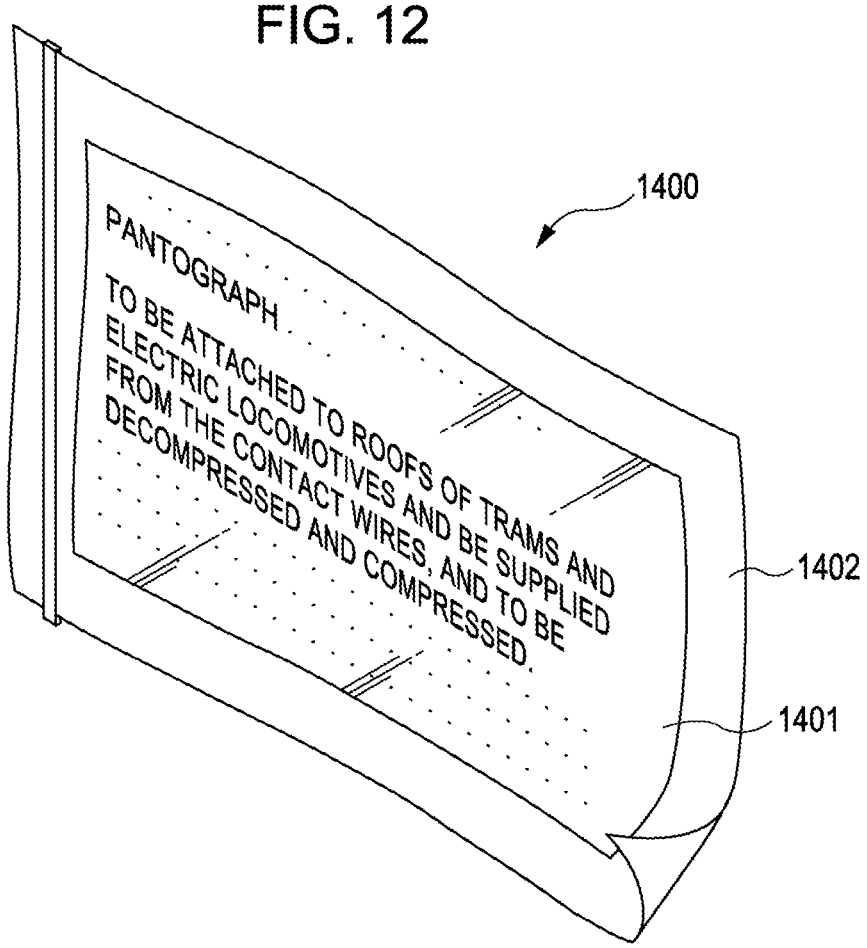
FIG. 12 is a perspective view illustrating the structure of an electronic paper as one example of an electronic apparatus to which an electrophoretic display device is applied.

FIG. 12 is a perspective view illustrating the structure of an electronic paper 1400.

As illustrated in FIG. 12, the electronic paper 1400 has the electrophoretic display device according to the embodiments described above as a display portion 1401. The electronic paper 1400 has flexibility and has a main body 1402 formed with a rewritable sheet having the same texture and softness as those of former paper.

Figure 13:
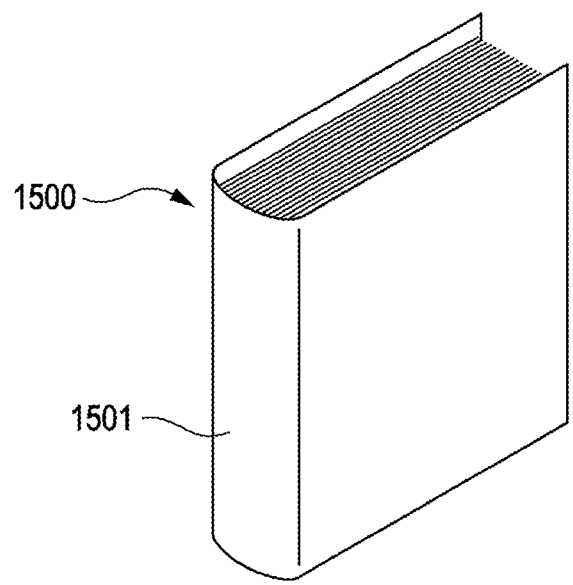
FIG. 13 is a perspective view illustrating the structure of an electronic note as one example of an electronic apparatus to which an electrophoretic display device is applied.

FIG. 13 is a perspective view illustrating the structure of an electronic note 1500.

As illustrated in FIG. 13, the electronic note 1500 is one in which two or more of the electronic papers 1400 illustrated in FIG. 12 are bound, and are held with a cover 1501. The cover 1501 has a display data input member (not illustrated) for inputting the display data transmitted from, for example, an external device. Thus, the display contents can be changed or updated in accordance with the display data in a state where the electronic papers are bound.

The electronic paper 1400 and the electronic note 1500 described above can perform image display with high reliability and high quality because the electrophoretic display device according to the embodiments described above is provided.

In addition, the electrooptical device according to the embodiment of the invention can be applied to various kinds of flexible devices in addition to the electronic paper and the electronic note described above.

The embodiment of the invention can also be applied to organic EL (Electro-Luminescence) devices, liquid crystal devices, and the like in addition to the electrophoretic display device described in the above-described embodiments.

The present invention is not limited to the above-described embodiments, and appropriate modifications can be made within the scope of the gist or idea of the invention which is understood from the claims and the whole of the specification. The technical scope of the invention also include such modifications of an electrooptical device substrate and a method for manufacturing the same, an electrooptical device, and an electronic apparatus, which are changed in such a manner.

What is claimed is:

1. An electrooptical device substrate, comprising:
a first insulating film provided on a substrate;
a plurality of pixels;
a first concave portion provided in the first insulating film over the plurality of pixels;
a second concave portion provided in the first insulating film on a bottom surface of the first concave portion;
a thin film transistor containing an organic semiconductor layer provided in the second concave portion, a gate insulating film of the thin film transistor provided in the first concave portion and on the organic semiconductor layer, and a gate electrode provided in the first concave portion and on the gate insulating film, the thin film transistor being matched to one pixel among the plurality of pixels;

a scanning line which is provided at an upper side with respect to the gate insulating film and provided in the first concave portion over the plurality of pixels; and a data line electrically connected to the thin film transistor.

2. The electrooptical device substrate according to claim 1, further comprising a second insulating film provided on the scanning line in such a manner as to fill the first concave portion.

3. The electrooptical device substrate according to claim 2, wherein the gate insulating film, the scanning line, and the second insulating film have the same shape in plan view.

4. The electrooptical device substrate according to claim 1, wherein the first insulating film contains a second insulating layer having the second concave portion and a first insulating layer provided on the second insulating layer.

5. The electrooptical device substrate according to claim 1, wherein a bottom surface of the second concave portion has lyophilicity to formation materials of the organic semiconductor layer and a region of the first concave portion in which the second concave portion is not provided has liquid repellency to the formation materials.

6. An electrooptical device, comprising the electrooptical device substrate according to claims 1.

7. An electronic apparatus, comprising the electrooptical device according to claim 6.

8. The electrooptical device substrate according to claim 1, wherein the first insulating film includes:
- a first partition portion that surrounds and forms the second concave portion; and
- at least two mutually adjacent second partition portions that form the first concave portion,
- wherein at least a portion of the first partition portion and at least a portion of the second partition portions are formed in the same plane.

* * * * *